United States Patent [19]

Kocher et al.

[11] 4,176,925

[45] Dec. 4, 1979

[54] LASER SCANNER FOR PHOTOLITHOGRAPHY OF SLOTTED MASK COLOR CATHODE RAY TUBES

[75] Inventors: Robert C. Kocher, Harvard; Alfred Piorkow, Sudbury, both of Mass.

[73] Assignee: GTE Laboratories Incorporated, Waltham, Mass.

[21] Appl. No.: 913,730

[22] Filed: Jun. 7, 1978

[51] Int. Cl.[2] .................... G03B 41/00

[52] U.S. Cl. .................... 354/1

[58] Field of Search .................... 354/1

[56] References Cited

U.S. PATENT DOCUMENTS

| | | | |
|---|---|---|---|
| 3,876,425 | 4/1975 | Geenen et al. | 354/1 |
| 4,027,312 | 5/1977 | Schlafer et al. | 354/1 |
| 4,053,905 | 10/1977 | Schlafer | 354/1 |

*Primary Examiner*—Monroe H. Hayes

*Attorney, Agent, or Firm*—Fred Fisher

[57] ABSTRACT

Three scanners are disclosed; common to all is an argon ion laser.

In the first two versions, light passes through a telescope, which is provided to expand and collimate the laser beam, through a servo-driven iris whose function is to adjust the length of the slit image to be formed by the optics. The beam enters a rotating cradle, passes through a cylindrical lens, and strikes a galvanometer-driven mirror. Rotating the galvanometer about its axis deflects the image of the laser beam on the main scanning mirror. A second lens images the galvanometer mirror onto the CRT panel. In the first version, the main scanning mirror is a flat reflector; in the second version, the scanning mirror is either a prism or a mirror set at 45 degrees to the incident laser beam. In both versions, a motor-driven optical rotator is between the galvanometer-driven mirror and the scanning mirror. Several important features include the servo-driven image rotator and the motor-driven iris.

In the third version, the optical rotator has been replaced by a motor-driven rotating mount for the cylindrical lens. The servo-driven iris has been replaced by a simple aperture, preferably elliptical or rectangular-shaped mounted coaxially to the cylindrical lens. The second lens has been replaced by a pair of adjustable diverging-converging lens. The main scanning mirror is linkage driven by a D.C. motor rather than directly coupled to the motor shaft.

10 Claims, 13 Drawing Figures

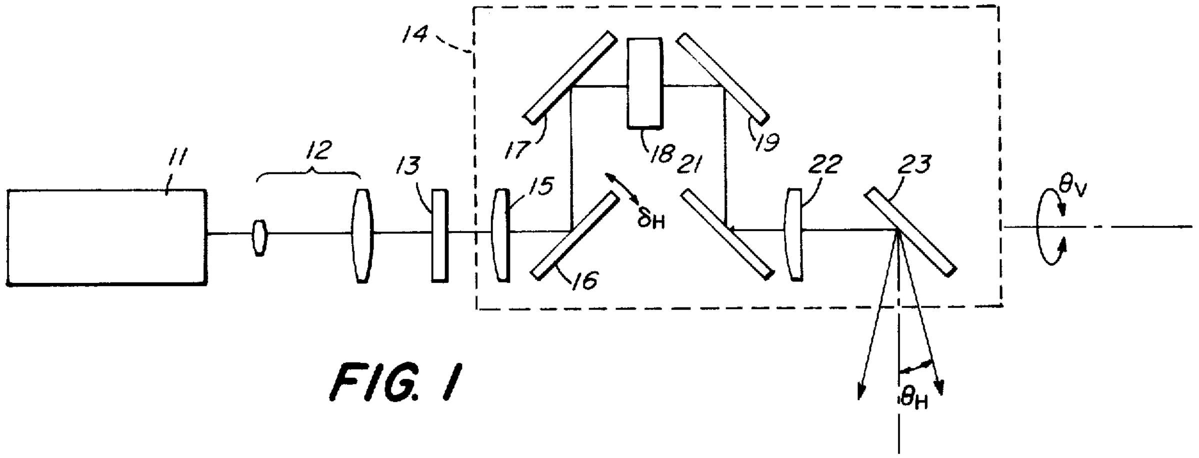
FIG. 1
FIG. 1A
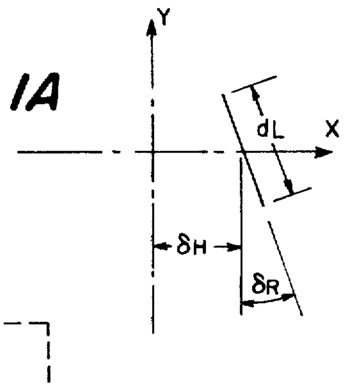
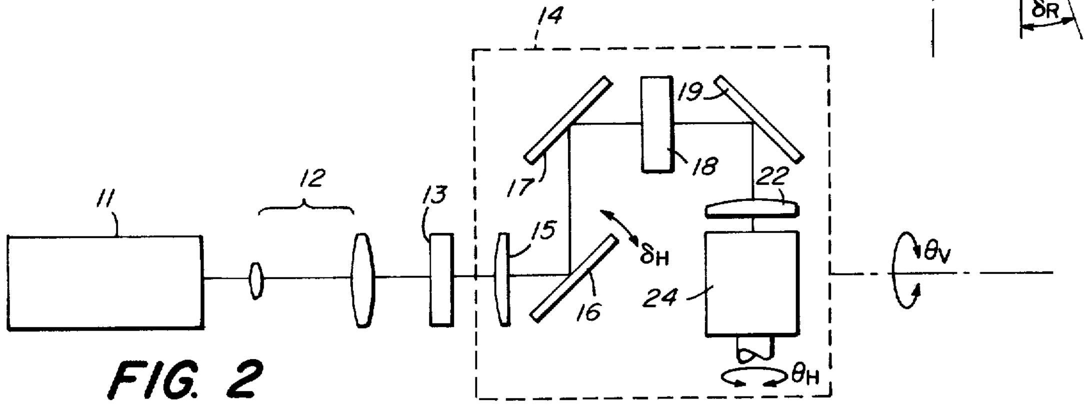
FIG. 2
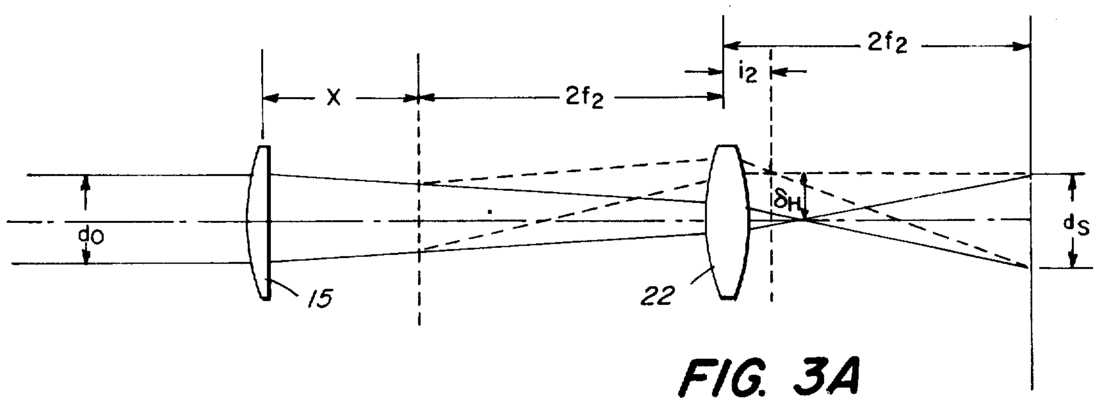
FIG. 3A

LASER SCANNER FOR PHOTOLITHOGRAPHY OF SLOTTED MASK COLOR CATHODE RAY TUBES

BACKGROUND OF THE INVENTION

1. Field of the Invention

This invention relates to laser scanning apparatus for photolithography of slotted mask color cathode ray tubes. Accordingly, it is a general object of this invention to provide new and improved apparatus of such character.

2. Description of the Prior Art

It is an object of this invention to provide new and improved means for shaping a beam from an argon ion laser and scanning the resultant beam across a photosensitive resist layer on the inside of the glass panel of a slotted mask cathode ray tube in order to expose the resist layer in a fashion consistent with the electron beam landing positions required in an operating cathode ray tube. Some suggestion has been set forth in U.S. Pat. No. 4,027,312, discussed in greater detail in the next heading, "Prior Art Statement".

Previous related art for the foregoing purpose, other than the '312 patent, included the use of a mercury arc lamp with a special quartz rod whose tip had been drawn into the shape of a wedge as a light source along with an aspheric lens juxtaposed between the source and the panel-mask assembly. The wedge shape of the rod (collector) tip was vital for the proper screening or exposure of the photoresist pattern in that the tip thus acted as a slit source of light for the slot apertures of the shadow mask. The wedged collector tip was aligned parallel to the slots of the shadow mask. The tip dimensions were chosen so that the bridges between the slots in the mask were not printed on the photoresist. Alternatively, the tip was moved along the direction of the edge of the wedge during exposure to print uniform stripes of photoresist on the panel. The aforementioned aspheric lens corrects the virtual location of the collector slit tip to position the photoresist stripes coincident with the electron beam landing positions in the CRT.

The subject matter described in U.S. Pat. No. 4,027,312 performs functions similar to the instant invention. For example, an argon ion laser is used as a source, a motor-driven assembly is used to scan the laser beam across the panel in a raster fashion and the function of virtual source location by means of galvanometer mirror scanners is employed. The optical system to be described differs significantly from the prior art and the control functions utilized in the following description are new.

3. Prior Art Statement

This prior art statement shall serve as a representation that the prior art listed herein includes, in the opinion of the applicants, the closest prior art of which they are aware. This statement shall not be construed as a representation that a search has been made or that no better art exists.

U.S. Pat. No. 4,053,905, issued Oct. 11, 1977 to John Schlafer, entitled "Optical Scanning Apparatus For Photolithography of a Color Cathode Ray Tube Having An Aperture Mask", relates to an optical scanning apparatus for use in manufacturing cathode ray tubes wherein a layer of a photosensitive material on the inner surface of a tube faceplate is exposed by scanning a light beam over an array of light transmitting apertures in a mask disposed adjacent to the layer of material on the faceplate. The apparatus includes:

(a) a light source for creating a light beam having a wavelength spectrum which exposes the photosensitive material, (b) means disposed in the path of the light beam for deflecting the light beam through an angle which is related to a predetermined angle of incidence that an electron beam has at each point on the aperture mask as it passes through the transparent regions of the mask in an operating tube, (c) optical means, operating on the deflected light beam, for imaging the point of deflection of the light beam substantially at the faceplate so that the light beam may be made to impinge on the mask with an angle of incidence related to that of an electron beam in an operating tube, the angle of incidence being obtained substantially without translation of the light beam at the faceplate, and (d) means for scanning the deflected light beam over the aperture mask in a predetermined fashion to expose the photosensitive material adjacent to all light-transmitting regions on the mask, the deflecting means being operative in synchronism with the scanning means to provide the light beam with the proper angle of incidence for each light-transmitting region on the mask.

U.S. Pat. No. 4,027,312, issued May 31, 1977 to John Schlafer et al., entitled "Optical Scanning Apparatus and Method for Manufacturing Cathode Ray Tubes", relates to an improvement in an optical scanning apparatus for manufacturing cathode ray tubes having a layer of photosensitive material disposed on the faceplate inner surface and exposed by scanning a light beam over an adjacent apertured mask wherein the optical scanning apparatus includes a light source provide a light beam of a wavelength which exposes the photosensitive material, means disposed in the path of the light beam for deflecting the light beam at an angle related to an angle of incidence of an electron beam in a cathode ray tube, means for imaging the deflected light beam at the faceplate of the cathode ray tube, and means for scanning the deflected light beam over the apertured mask in a predetermined fashion to expose the photosensitive material adjacent the apertures of the mask. The improvement comprises means for controlling the effective area occupied by the light beam at the scanning means to effect control of the size and shape of the exposed area of photosensitive material in relation to an associated aperture in the mask.

Various scanning exposure systems are known. In such a system, a small light beam is scanned over the aperture mask so as to expose the photosensitive material adjacent to the light-transmitting regions or apertures in the mask. For example, a scanning exposure system is described in the British Patent Specification No. 1,257,933. In this patent, a scanned laser beam is used in conjunction with an aperture mask and photosensitive material for delineating phosphor patterns on faceplates for color CRTs. However, this patent does not provide for correction of the inherent discrepancy between electron beam landings and phosphor locations.

Another scanning exposure system is described in the U.S. Patent to Geenen et al., No. 3,876,425. In this system, the effective light beam source is actually translated about a source plane to provide correlation between phosphor locations and electron beam landing locations. Such beam translation eliminates the need for the aspheric lens which is necessary in the non-scanning exposure system. In the system described in the Geenen patent, the effective light beam source is the center of a mirror which deflects the beam toward the faceplate. An optical system always insures that the beam from the actual source is always directed to the center of the scanning mirror. The scanning mirror is carried by an assembly that rotates the mirror about two orthogonal axes to provide scanning and that translates the mirror along two orthogonal axes to provide movement of the center of the mirror in the source plane. The optical system includes a plurality of mirrors, bearing assemblies and a telescoping member.

This system has limitations which render it less than suitable for use in a production environment for cathode ray tubes. First, a scanning exposure system must have accurate optical alignment characteristics, i.e., the ability to repeatedly position the light beam at a predetermined point on the faceplate. The mechanical and optical system described is of such a complicated nature that it is doubtful that such alignment characteristics could be obtained. More specifically, the large number of rotating parts and simultaneously rotating and translating parts of the system could result in misalignment with continued use as is necessary in a production environment. Furthermore, the feature of actually translating the effective light beam source in a plane adds complexity to the electronic system which is necessary to control the scanning and mirror translation functions. More specifically, each time the mirror is translated, the beam if not corrected by the scanning function, would impinge upon other than the desired faceplate location. Thus, the translating and scanning functions are interdependent.

Both the British Patent Specification No. 1,257,933 and U.S. Pat. No. 3,876,425 to Geenen are mentioned in both the above U.S. Pat. Nos. 4,053,905 and 4,027,312.

U.S. Pat. No. 4,030,790, issued June 21, 1977 to G. Norman Williams et al., entitled "Process for Fabricating Lenses for Manufacturing Cathode Ray Tube Screen Structures", in the field of manufacturing color cathode ray tube screen structures, relates to a lens fabricating process utilizing optical scanning exposure apparatus having a positionally locatable light beam source comprising the steps of:

selecting a matrix of data points on the viewing screen of a cathode ray tube;

altering the positional location coordinates of said light beam source of said optical scanning exposure apparatus to effect light beam impingement at each of said data points;

recording said altered positional coordinates of said optical scanning exposure apparatus;

constructing a cathode ray tube having a viewing screen structure with a field of phosphor elements fabricated in accordance with said altered position location coordinates of said optical scanning exposure apparatus;

measuring the error of impingement of an electron beam on said elements of said phosphor field at said viewing screen of said cathode ray tube;

varying said recorded altered positional location coordinates of said optical scanning exposure apparatus in accordance with said measured error of impingement; and submitting said varied positional location coordinates of said optical scanning exposure apparatus to a lens design program to provide lens manufacturing information.

U.S. Pat. No. 4,053,903, issued Oct. 11, 1977 to Thomas W. Schultz, entitled "Scanning Rate and Intensity Control for Optical Scanning Apparatus" relates to an improvement in a control system for use with an optical scanning exposure system in manufacturing cathode ray tubes having a faceplate with a layer of photosensitive material thereon. The optical scanning exposure system includes a light source with a wavelength spectrum for exposing the photosensitive material, means for scanning the faceplate with a light beam, and means for deflecting the light beam at an angle related to the angle of incidence of an electron beam in a cathode ray tube. The electrical control system includes an angle of incidence and scan rate memory means, a scan rate means for controlling scanning of the light beam, and an angle of incidence deflection control means for controlling the angle of incidence of the light beam. The improvement comprises means for controlling the integral with respect to time of the light beam intensity at each exposed region of photosensitive material on the faceplate of the cathode ray tube to provide a predetermined amount of exposure at predetermined positional locations across the surface of the faceplate.

U.S. Pat. No. 4,053,904, issued Oct. 11, 1977 to G. Norman Williams et al., entitled "Overlap and Overscan Exposure Control System" relates to an improvement in a method for controlling an optical scanning exposure system for exposing a photosensitive layer on a faceplate of a cathode ray tube wherein the electrical control system includes an angle of incidence and scan rate memory storage means, scanning means, and an angle of incidence control means and the method for controlling the optical scanning exposure system includes the steps of activating the scan rate means to cause light beam scanning of the faceplate of the cathode ray tube, applying signals representative of the positional location of a light beam to the angle of incidence and scan rate memory means to derive signals representative of the angle of incidence of an electrom beam, coupling the signals representative of the angle of incidence of an electron beam to said angle of incidence control means, and coupling signals representative of said desired rate of scan to said means for effecting horizontal and vertical scanning. The improvement comprises the added step of:

retrieving from said angle of incidence and scan rate memory means signals for altering the operation of said scan rate means to cause said horizontal and vertical light beam scanning means to provide overlapping adjacent horizontal scan lines and more uniform illumination of the photosensitive layer on the faceplate of the cathode ray tube.

U.S. Pat. No. 4,053,906, issued Oct. 11, 1977 to Thomas W. Schultz, entitled "Control System for a Optical Scanning Exposure System for Manufacturing Cathode Ray Tubes" relates to a control system in which there is provided a memory storage device for storing information representative of the proper angle of incidence of a light beam at a matrix of positional locations on the faceplate of the cathode ray tube and of the rate of scan of the light beam from one positional location to the next. The encoder provides horizontal and vertical light beam scan position information into the (memory) storage device. A scan rate device, responsive to the scan rate and position information in the memory storage provides signals for controlling the rate of light beam scanning. Further, an angle of incidence control device, responsive to angle of incidence and position information from the memory storage, provides electrical signals for the galvanometers which control the angle of incidence deflecting mirrors.

U.S. Pat. No. 4,050,081, issued Sept. 20, 1977 to Thomas W. Schultz, entitled "Exposure Area Control for an Optical Scanning System for Manufacturing Cathode Ray Tubes" relates to an improvement in a control system for use with an optical scanning exposure system in manufacturing cathode ray tubes having a faceplate with a layer of photosensitive material thereon, the optical scanning exposure system includes a light source with a wavelength spectrum for exposing the photosensitive material, means for scanning the faceplate with a light beam, and means for deflecting the light beam at an angle related to the angle of incidence of an electron beam in a cathode ray tube. The electrical control system includes an angle of incidence and scan rate memory means; a scan rate means for controlling scanning of the light beam, and an angle of incidence control means for controlling the angle of incidence of the light beam. The improvement comprises means for providing a source of signals for combination with a signal from said angle of incidence control means and coupled to said angle of incidence deflector means to cause movement of the effective light beam source in a source plane and provide an increased area of partial exposure and a decreased area to full exposure of said faceplate whereby the exposure area size and shape is controlled.

Various of the above-identified patents have been assigned as follows:

| U.S. Pat. No. | Assignee(s) |
|---|---|
| 4,027,312 | GTE Laboratories Incorporated<br>GTE Sylvania Incorporated |
| 4,030,790 | GTE Sylvania Incorporated |
| 4,050,081 | GTE Sylvania Incorporated |
| 4,053,903 | GTE Sylvania Incorporated |
| 4,053,904 | GTE Sylvania Incorporated |
| 4,053,905 | GTE Laboratories Incorporated |
| 4,053,906 | GTE Sylvania Incorporated |

Both GTE Laboratories Incorporated and GTE Sylvania Incorporated are majority owned subsidiaries of General Telephone and Electronics Corporation.

SUMMARY OF THE INVENTION

Another object of this invention is to provide new and improved apparatus and methods for laser scanning the faceplate of a color cathode ray tube, and, in particular, to a color cathode ray tube utilizing a slotted mask.

Yet another object of this invention is to provide new and improved apparatus and methods for controlling such laser scanning of slotted mask color CRT's in an effective manner.

In accordance with one embodiment of this invention, light passes from an argon ion laser, through a servo-driven iris, enters a rotating cradle, passes through a cylindrical lens, and strikes a galvanometer-driven mirror. Rotating the galvanometer about its axis deflects the image of the laser beam on the main scanning mirror. A second lens images the galvanometer mirror onto the CRT panel. A motor-driven optical rotator lies between the galvanometer-driven mirror and the scanning mirror. The scanning mirror is a flat reflector.

In a second embodiment, similar to the one just described, the scanning mirror is either a prism or a mirror set at 45 degrees to the incident laser beam.

In accordance with a third embodiment of the invention, similar to the two just described, the optical rotator is replaced by a motor-driven rotating mount for the cylindrical lens, the servo-driven iris is replaced by a simple aperture, preferably elliptical or rectangular-shaped mounted coaxially to the cylindrical lens. The second lens is replaced by a pair of adjustable diverging-converging lens. The main scanning mirror is linkage driven by a DC motor. Vertical scan motion is provided by a lead screw and sliding connecting arm drive. A translation micrometer acts to move a plate supporting the faceplate panel an accurate displacement in a direction parallel to the line joining the centers of the three electron guns in the working CRT. The scanner can be converted from exclusive use in according slotted mask panels to exposing delta (dot) panels by replacing the single axis galvanometer with a servodriven two axis gimbal mounted mirror.

BRIEF DESCRIPTION OF THE DRAWINGS

Other objects, advantages, and features of this invention will become more apparent from the following description, when read in conjunction with the accompanying drawings, in which like reference symbols refer to like parts, and in which:

FIG. 1 is a diagrammatic view of one embodiment of this invention;

FIG. 1A illustrates three source control variables which, along with the two beam scan angles shown in FIG. 1, constitute the five program variables for the scanner;

FIG. 2 is a diagrammatic view of a second embodiment of this invention;

FIG. 3A is a simplified schematic sectional view of the optical path through the scanner, taken perpendicular to the slot axes;

DESCRIPTION OF SEVERAL EMBODIMENTS OF THIS INVENTION

Figure 3B:
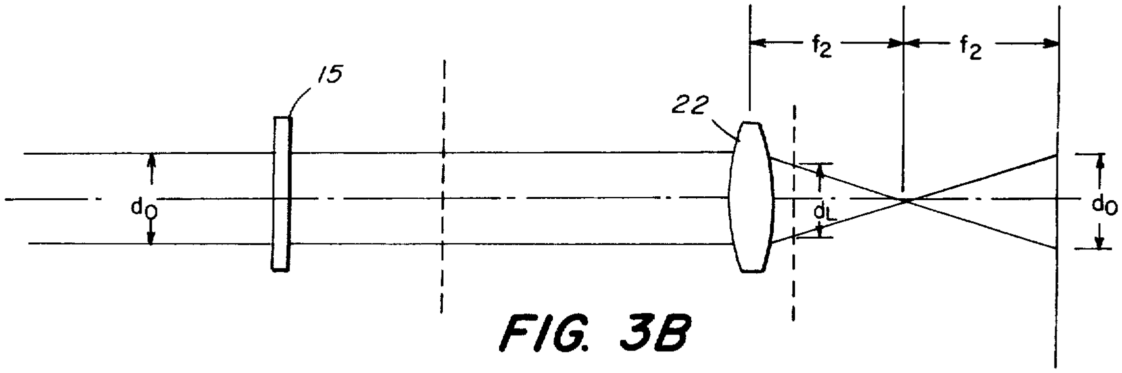
FIG. 3B is a simplified schematic section view of the optical path through the scanner, taken parallel to the slot axes.

Two embodiments of this invention are depicted in FIGS. 1 and 2, respectively. In both embodiments, an argon ion laser 11 provides the light source to a telescope 12 which expands and collimates the laser beam to a desired size (e.g., one inch in diameter). The beam then passes through a servo-driven iris 13 whose function is to adjust the length of the slit image to be formed by the optics. The iris 13, preferably, is under direct program control throughout the panel raster scan. The beam then enters a rotating cradle assembly 14 along the axis of rotation. Motion of the cradle assembly 14 about this axis causes the projected laser beam to scan across the cathode ray tube panel (not shown) in the shorter or vertical dimension ($\theta_v$). In both embodiments, as depicted in FIGS. 1 and 2, the beam then passes through a cylindrical lens 15 and strikes a galvanometer driven-mirror 16. The axis of rotation of the galvanometer-driven motor 16 is perpendicular to the beam and the cradle 14 axis of rotation. The cylinder axis of the lens 15 is parallel to the axis of the galvanometer-driven mirror 16. A split image of the laser beam, of length $d_L$ (FIGS. 3B and 4B), is formed at the focus of the cylindrical lens.

Its width is limited primarily by diffraction effects and the quality of the lens, and is typically on the order of ten microns.

The beam bending mirrors 17, 19, 21 and 17, 19 in both embodiments of FIG. 1 and FIG. 2, respectively, are used to bring the laser beam into the proper incidence onto the main scanning mirror 23 and 24 (FIGS. 1 and 2, respectively). In the embodiment of FIG. 1, the main scanning mirror 23 is a flat reflector whose axis of rotation is parallel to that of the galvanometer-driven mirror 16. The beam bending mirrors 17, 19 cause the laser beam to intercept the mirror 23 coincident with the cradle 14 axis of rotation when the galvanometer is undeflected. Rotation of the scanning mirror 23 causes the beam spot on the panel to sweep across the panel in a horizontal motion $\theta_H$.

The embodiment depicted in FIG. 2 differs from that shown in FIG. 1 in that the scanning mirror 24 is either a prism or a mirror set at 45 degrees to the incident laser beam. The axis of rotation of the servo motor driving the main scanning mirror 24 is at right angles to the cradle 14 axis of rotation. Thus, this second embodiment features a constant angle of incidence of the laser beam onto the scanning mirror 24 as $\theta_H$ is varied, and allows the use of either high efficiency dielectric coating or total internal reflection for maximum efficiency of the scanning mirror 24.

Rotating the galvanometer-driven mirror 16 about its axis deflects the image of the laser beam on the main scanning mirror 23 (FIG. 1) or 24 (FIG. 2). A lens 22 images the galvanometer-driven mirror 16 onto the CRT panel. Thus, the laser beam spot on the panel does not move as the galvanometer-driven mirror 16 is rotated; only the angle of incidence of the beam onto the panel is changed by the motion of the galvanometer-driven mirror 16.

In both the first and second embodiments of FIGS. 1 and 2, a motor-driven image optical rotator 18 is located in the optical path between the galvanometer-driven mirror 16 and the main scanning mirror 23 or 24. The optical rotator 18 can be either a Dove or Pechan prism whose purpose is to rotate the slit image formed by the cylindrical lens 15 on the main scanning mirror 23 or 24. Such a function is desirable for the second embodiment because the deflection of the image on the scanning mirror 24 produced by rotation of the galvanometer-driven mirror 16 rotates about the center of the scanning mirror 24 when this is rotated through the horizontal scan angle $\theta_H$. In both embodiments, the programmed rotation angle $\delta R$ is controlled to minimize "shingling" or misalignment of photoresist stripes towards the ends of the raster scan pattern caused by the curvature of the shadow mask and the panel surface. The sketch of FIG. 1A illustrates the three source control variables ($\delta H$, $\delta R$, $d_L$) programmed directly from digital control electronics driving the scanner. These three variables along with the two beam scan angles $\theta_V$, $\theta_H$ constitute the five program variables for the scanner.

FIGS. 3A and 3B illustrate two simplified schematic, sectional views of the optical path through the scanner, perpendicular to the slot axes and parallel to the slot axes, respectively. The beam bender mirrors 17, 19, 21 are deleted, and the beam path resulting from the galvanometer deflection $\delta H$ is shown by the dotted lines in FIG. 3A. Note that this particular configuration of the optics places the scan imaging lens 22 at equal distances of twice its focal length from both the galvanometer deflector mirror 16 and the glass panel surface. Thus, the lens images the galvanometer mirror 16 and the resulting angular deflection produced by it in a one-to-one ratio onto the panel. As is shown by FIG. 3B, this arrangement also produces a spot height parallel to the shadow mask slot axes equal to the diameter of the entering laser beam. The spot height perpendicular to the slot axes, $d_s$ shown in FIG. 3A is different from this and depends on the effective focal length of the lens 15 as well as the distance of the lens 15 from the galvanometer deflector 16. Alternatively, the lenses 15 and 22 could be replaced with cylindrical and spherical mirrors, respectively.

Figure 4A:
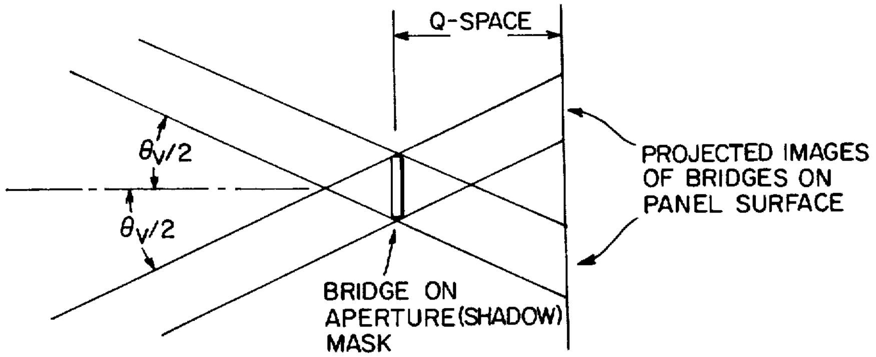
FIG. 4A is a sketch illustrating how the bridge image is scanned in a direction parallel to its length as the laser beam is scanned through a vertical angle.

FIG. 4A illustrates how the bridge image is scanned in a direction parallel to its length as the laser beam is scanned through a vertical angle $\theta_V$.

Figure 4B:
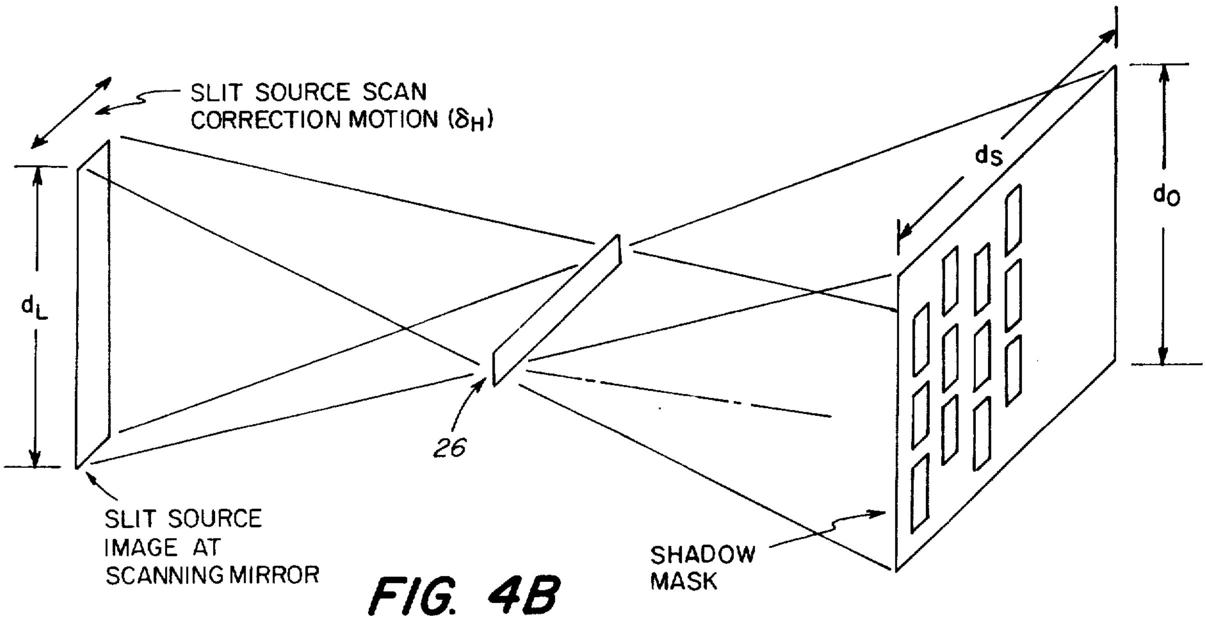
FIG. 4B is a detail of the slit source image formation at the scanning mirror and the use of such image for creating uniform photoresist stripe exposures through the slotted mask apertures onto the panel.

FIG. 4B illustrates a detail of the slit source image formation at the scanning mirror 23, 24 and the use of this image for creating uniform photoresist stripe exposures through the slotted mask apertures onto the panel. FIG. 4B shows that the height of the slit source $d_L$ controls the amount of overlap of the images of the slot bridges as the beam is raster scanned across the panel surface. The optical system reduces the required height of the image by forming an intermediate image 26 between the scanning mirrors 23, 24 and the panel. In this invention, the degree of scan pattern overlap in the vertical direction depends on the actual bridge dimensions and the distance from the shadow mask to the panel surface (Q-space distance).

Various novel features of these two embodiments include a simplified lens system. A cylindrical lens forms a slit source for the exposure of the photoresist layer on the panel in the slotted mask color CRT's. Either or both of the lenses 15, 22 could be replaced with curved mirrors. The means for controlling slit image rotation $\delta R$ by means of a servo-driven lens rotator is believed novel; such rotator aids in reducing "shingling" in cathode ray tubes. Further, independently controlling slit height $d_L$ by means of a motor-driven iris during raster scan is believed novel; such iris permits direct program control of beam divergence at the panel and thus slot bridge imaging location at the panel.

DESCRIPTION OF THE THIRD, AND PREFERRED, EMBODIMENT

The third embodiment, depicted in FIGS. 5-10, represents the best mode contemplated by the inventors for practicing the invention.

Figure 5:
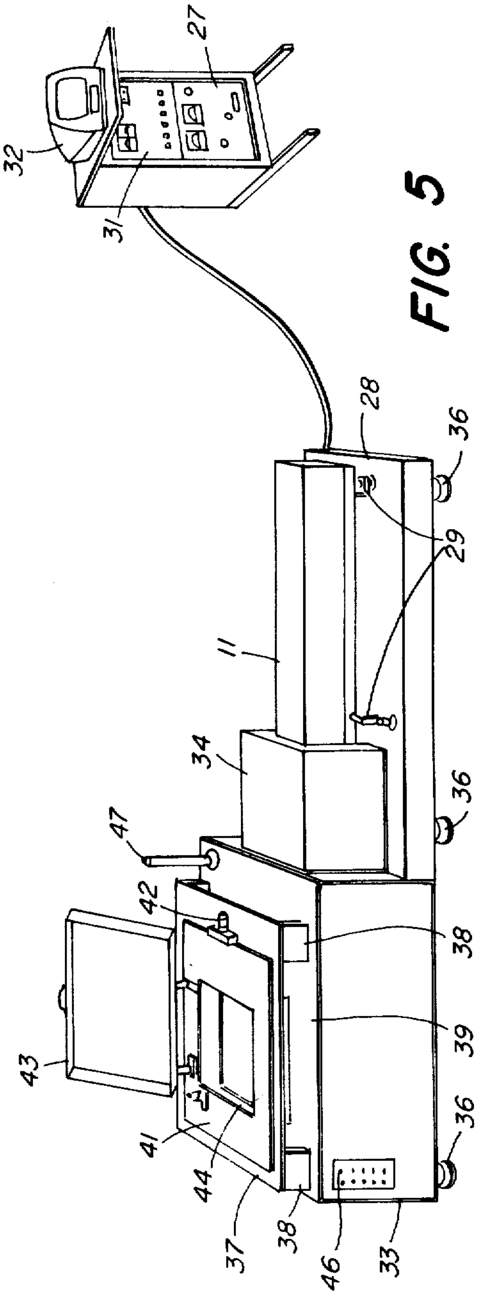
FIG. 5 is a rear perspective view of a third embodiment of this invention.

Referring particularly to FIG. 5, a laser power supply 27 is coupled to the argon ion laser which is coupled to a cast aluminum base plate 28 by laser mounts 29—29.

A microprocessor 31 and terminal 32 are coupled to the laser power supply housing.

The argon ion laser 11 is directed to a scan cradle enclosure 33 with a dust cover 34 enclosing the juncture therebetween. The cast aluminum base plate 28 and scan cradle enclosure 33 rest on the floor by way of a vibration isolation system 36—36.

An elevating plate 37 is coupled to four spacer blocks 38—38 which are coupled to the top, or the support frame 39, of the scan cradle enclosure 33. A translating jig plate 41 is supported on top of the elevating plate 37 and can be translated horizontally by means of a translation micrometer 42.

A safety cover 43 is provided to cover the cut-out 44 in the translation jig plate 41 so as to prevent any eye damage from scanner laser beams.

The unit is provided with an indicator panel 46 attached to the front of the scan cradle enclosure 33, and an exposure indicating light 47 affixed to the support frame 39.

Figure 7:
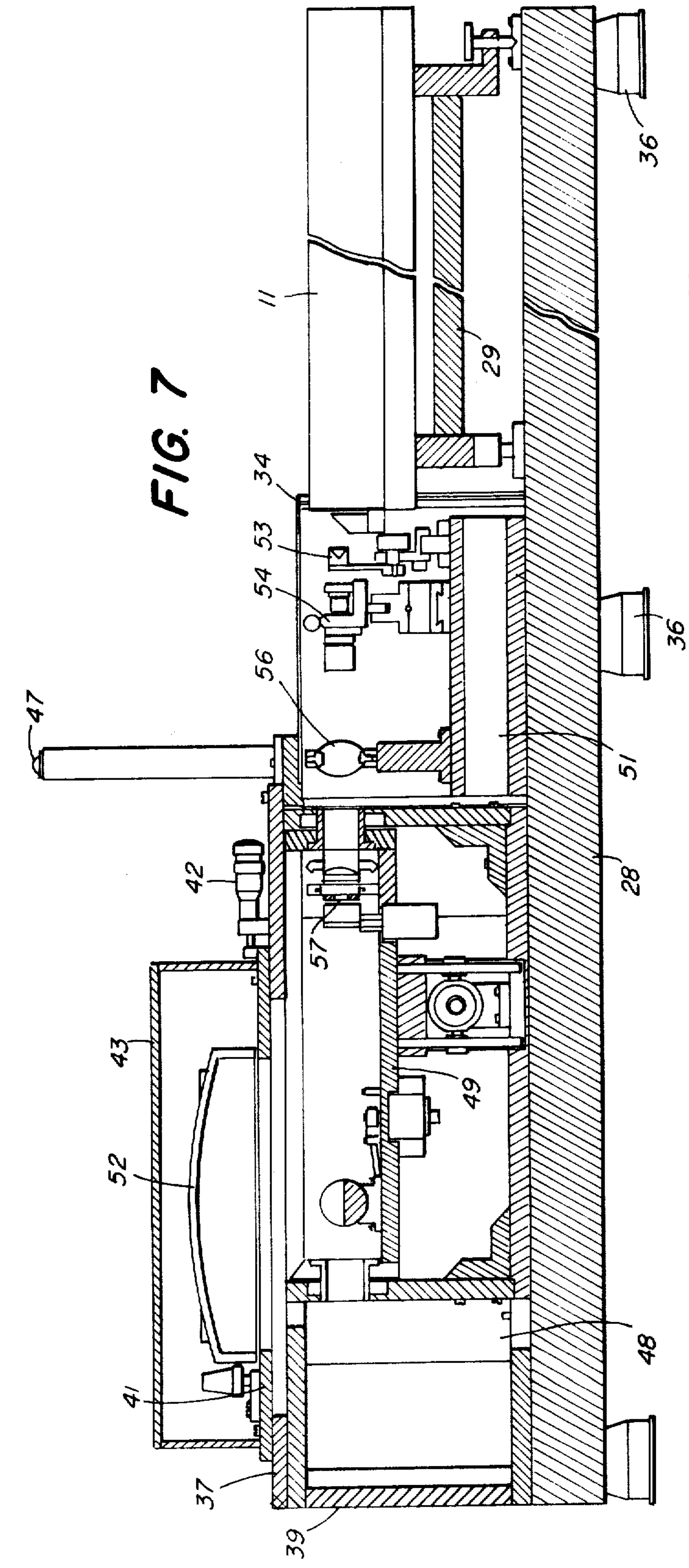
FIG. 7 is a center sectional view of the embodiment depicted in FIG. 5.

Referring particularly to FIG. 7, in which components shown in FIG. 5 are also depicted (with the exception of the laser power supply 27, microprocessor 31, and terminal 32), the scan-cradle enclosure 33 includes an interlocked side panel 48, and a cradle 49 housed therewithin. An optical stage 51 couples the argon ion laser 11 to the cradle assembly 49.

A face panel 52 for a color cathode ray tube is placed on top of the translating jig plate 41, over the cut-out 44. When the face panel 52 is in place, the safety cover 43 can be closed, and laser operation commenced. The safety cover 43 and dust cover 34 are provided with interlocks to prevent personal injury from a laser beam.

Figure 8:
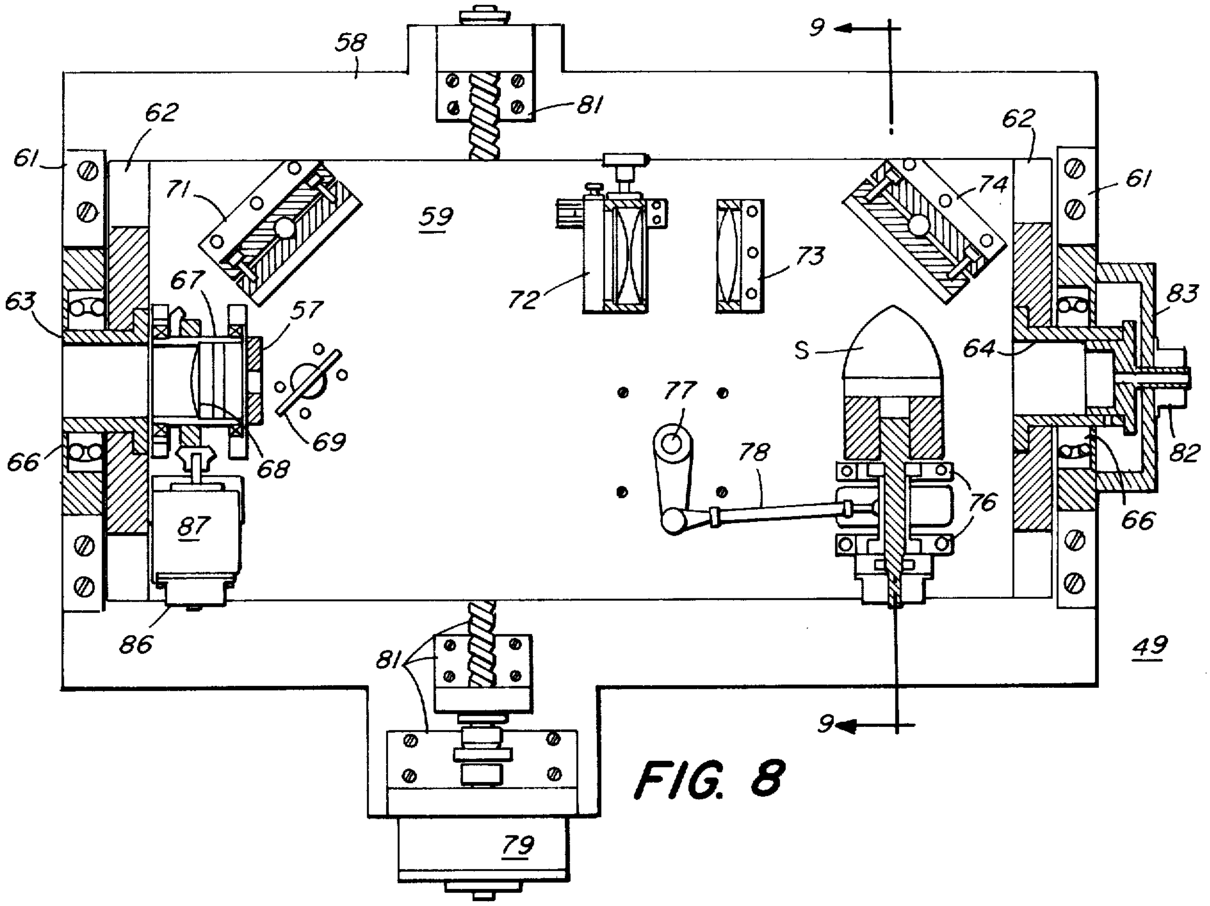
FIG. 8 is a sectional view taken along the line 8—8 of FIG. 6.
Figure 6:
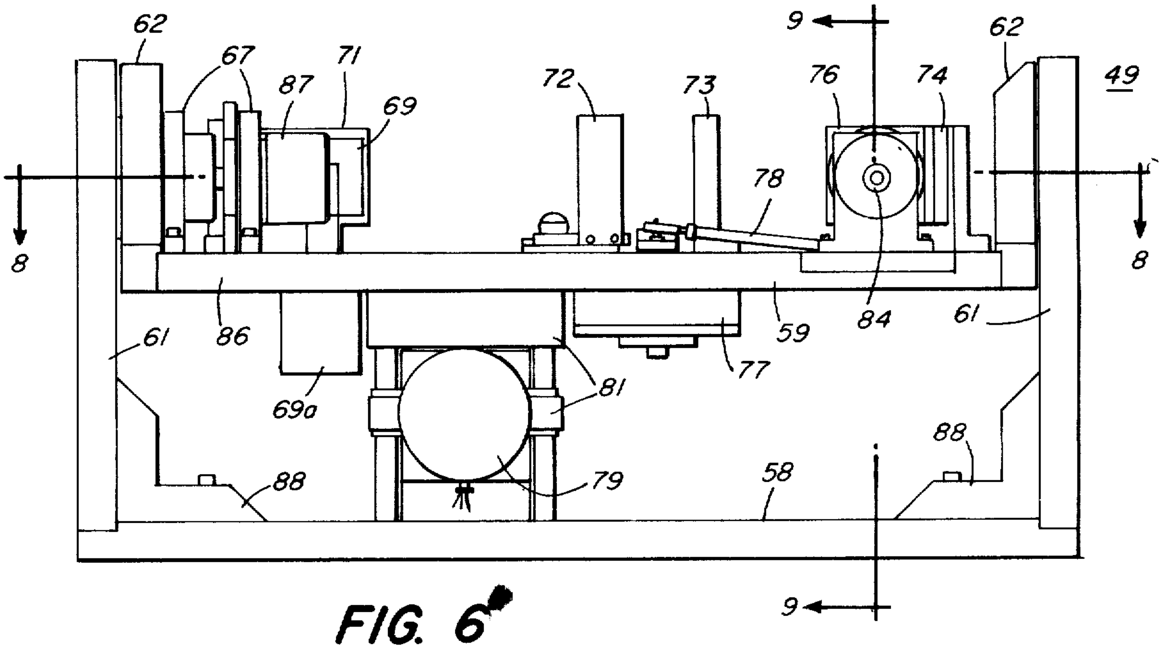
FIG. 6 is a front view of the embodiment depicted in FIG. 5.
Figure 9:
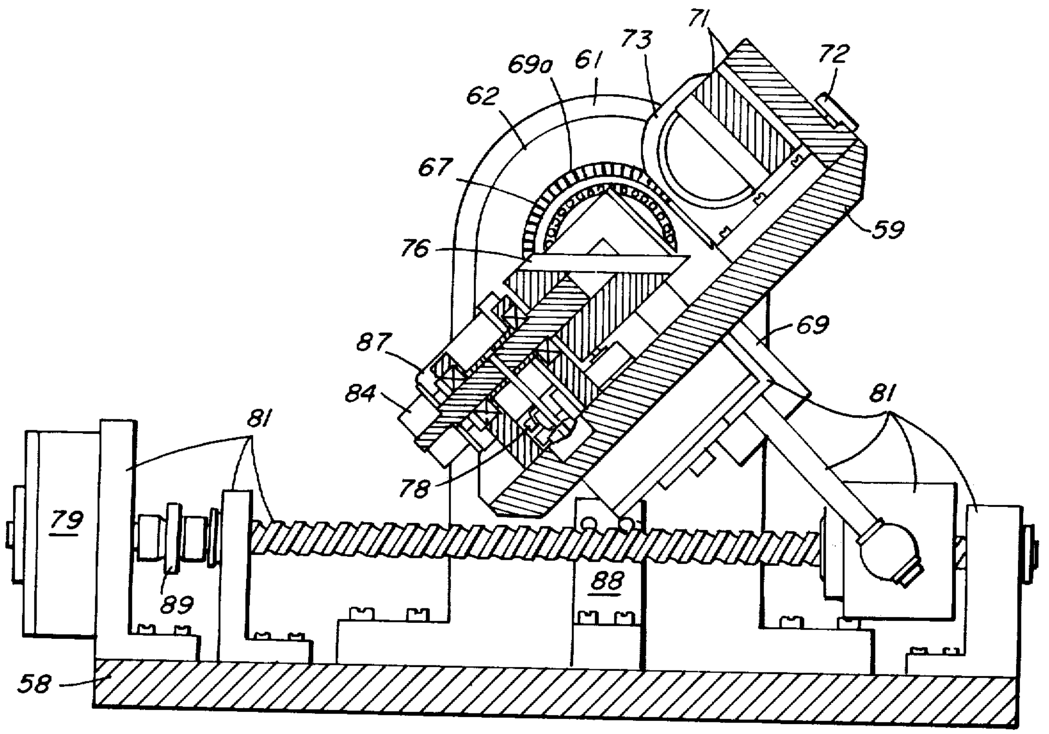
FIG. 9 is a sectional view, showing the cradle platform tilted at a 45 degree angle, taken along the line 9—9 of FIG. 8.

As depicted in FIG. 7, the laser beam from the argon ion laser 11 passes through a shutter 53 (which is also provided with an interlocking mechanism), through a beam expander telescope 54, to a shearing interferometer plate 56 to the cylindrical lens 68 (FIG. 8) and aperture 57 both mounted in the rotating lens subassembly 67 (FIGS. 6 and 8). The shearing interferometer 56 is used to determine the parallelism of the laser beam emerging from the beam expander telescope 54.

Referring to FIGS. 6 and 8, the cradle assembly 49 includes a cradle base 58, a cradle platform 59, a pair of bearing posts 61—61, and a pair of cradle yokes 62—62. As shown in FIG. 8, a short bearing sleeve 63 is provided at the side of the cradle assembly 49 proximate to the argon ion laser 11. A long bearing sleeve 64 is provided at the opposite end. The sleeves 63, 64 are supported within their associated bearing posts 61—61 by means of suitable ball bearings 66—66.

Referring, again, to FIGS. 6 and 8, light from the laser passes through the short bearing sleeve 63 through a rotating lens subassembly 67 which houses a cylindrical lens 68. Light is then reflected by a galvanometer-driven mirror 69 to beam bending mirror 71. The light thus reflected from the mirror 71 passes through an adjustable diverging lens 72 through a fixed converging lens 73 to a second beam bending mirror 74.

Light from the second beam bending mirror 74 is reflected to a scanning mirror 76. A motor 77 drives the scanning mirror 76 via linkage 78. A motor 79 drives a lead screw assembly 81. A first encoder 82 is coupled to the right hand portion of the cradle assembly, as viewed in FIG. 8, by an encoder coupling subassembly 83. Another encoder 84 is coupled to the front of the scanning mirror 76. A third encoder 86 is coupled to the rotating lens subassembly 67 via a motor 87. The bearing posts 61—61 are supported on the base by cradle braces 88—88. A wafer spring coupling 89 joins the lead screw assembly 81 to the motor 79.

Figure 10:
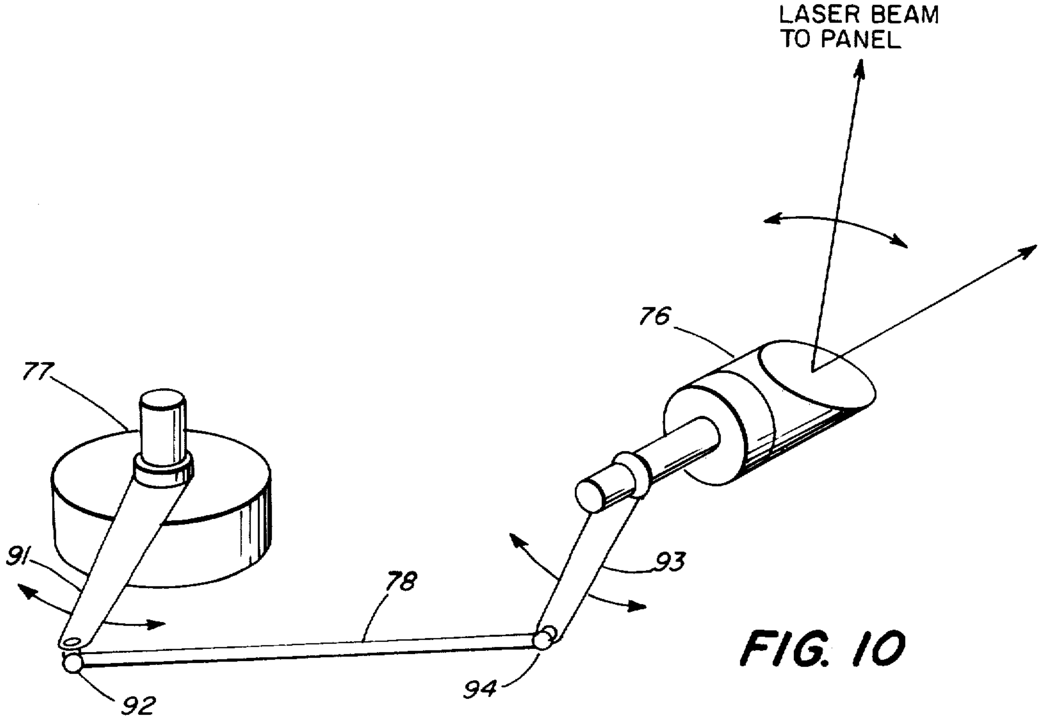
FIG. 10 is a schematic view of the scan mirror drive for the third embodiment of this invention.

Referring to FIG. 10, the main scan mirror 76 is driven by the servo motor 77 via linkage 78. A crank arm 91 couples the servo motor 77 to a rod end 92 of the linkage 78. The main scan mirror 76 is driven by a driven arm 93 having its rod end 94 coupled to the linkage 78.

Various differences are apparent between the first two embodiments and the preferred, third, embodiment. For example:

1. The optical rotators 18 on both versions of FIGS. 1 and 2 have been replaced by a motor 87 driven rotating mount 67 for the cylindrical lens 68 of FIG. 8. Rotating the cylindrical lens 68 about the optical axis of the scanner causes the line source image formed at the main scan mirror 76 to rotate in the same manner as the scan mirror 24.

2. The device shown in FIGS. 1 and 2 as a servo driven iris 13 has been replaced by a simple aperture 57 (FIG. 7). Such a change is a matter of convenience for this third embodiment, and in no way obviates the function of the motor-driven iris 13. An elliptical or rectangular-shaped aperture 57, mounted coaxially to the lens 68 and affixed to the rotating lens assembly 67, has the effect of changing the spot diameter labeled as $d_s$ of FIG. 3A with respect to the diameter $d_o$. Because the spot diameter in the direction of horizontal scan is always $d_s$, decreasing this diameter means that the effective registration resolution increases (at the expense of total laser beam power transmitted to the panel). By orienting this aperture to thus reduce $d_s$ while maintaining $d_o$ large for exposing the photoresist behind the slot bridges as shown in FIG. 4B, as decided improvement may be obtained.

3. Another difference is the replacement of the single lens 22 shown in FIGS. 1 and 2 with the two lenses 72, 73. In FIG. 8, lens 72 is a diverging lens whose focal length is the negative of the value for the converging lens 73. The combination of these two lenses 72, 73 produces the effect of a single converging lens, the focal length of which varies as the separation between the two lenses 72, 73 is changed. The purpose of this is to accommodate changes in the spacing between the main scanning mirror 76 and the CRT panel surface required for the screening of different size and type CRT tube panels. The two lens 72, 73 combination is therefore adjusted for each respective panel type to image the galvanometer deflector axis of rotation onto the center of the panel. This is accomplished by moving the lens 72 only while keeping the lense 73 fixed. This then allows the laser beam to remain focussed as a line image onto the scanning mirror 76 plane while lens 72 is moved. In a preferred design presented, the focal length of the cylindrical lens 68 is +600 mm and the respective focal lengths of lens 72 and 73 are −120.0 mm and +120.0 mm. By varying the spacing between lens 72 and 73 between 63.7 and 83.5 mm, panel heights (between main scanning mirror center and center of panel inside surface) between 440 and 200 mm can be accommodated. This range corresponds to CRT tube types between 25V90 and 19V100.

4. Another difference is that the main scanning mirror 76 is driven by a DC electric motor 77 by means of a linkage 78 shown in FIG. 10 rather than directly coupled to the motor shaft as was in the prior art. This is done to eliminate the adverse optical effects of the motor shaft end play as found in the prior art. The linkage arms 91, 92 and connecting rod lengths 92, 94 as well as shaft offsets have been selected so that the angular shaft rotations of the scanning mirror 76 and the motor 77 are equal to each other within a 1% error. This design allows use of a motor tachometer built into the DC motor 77 to monitor and servo-control the horizontal scan rate which is related directly to the uniformity of exposure to the panel photoresist layer.

5. A further improvement over the prior art is the replacement of a worm gear drive for vertical scan motion by lead screw and sliding connecting arm drive shown in FIG. 9. The new drive provides a constant torque, high mechanical advantage drive system in which the angular vertical tilt angle $\theta_v$ is not directly proportional to the lead screw rotation. The arrangement shown provides progressively smaller tilt changes with lead screw motor steps as $\theta_v$ gets larger, leading to a finer vertical resolution in raster line steps near the top and bottom edges of the panel.

6. The translation micrometer 42 shown in FIGS. 5 and 7 is new. This acts to move the plate supporting the faceplate panel an accurate displacement in a direction parallel to the line joining the centers of the three electron guns in the working color CRT. The micrometer 42 allows additional control of the location of the respective phosphor stripes on the panel.

7. A method of converting the scanner shown in FIGS. 5–10 from exclusive use in screening slotted-masks panels to exposing conventional delta (dot) panels includes replacing the cylindrical lens $L_1$ with a plano-convex spherical lens of the same focal length and replacing the single axis galvanometer driven mirror 69 by a servo-driven two axis gimbal mounted mirror. The optical system then focusses the incoming laser beam to a tiny spot on the main scanning mirror 76 which could be independently moved in two orthogonal directions over the mirror by the two orthogonal tilts of the gimbal mount.

IN GENERAL

Other embodiments will present themselves to those skilled in the art, without departing from the spirit and scope of the issued claims.

What is claimed is:

1. Laser scanning apparatus for use in manufacturing color cathode ray tubes wherein a layer of photosensitive material on the inner surface of a tube faceplate is exposed by scanning a laser beam over an array of light transmitting apertures in a mask disposed adjacent to the layer of material on the faceplate, the apparatus including:
   (a) a laser source for creating a light beam having a wavelength spectrum which exposes the photosensitive material;
   (b) an optical stage coupled to receive the light beam from said laser source,
   (c) a scan cradle enclosure, coupled to receive the light beam from said optical stage, said enclosure comprising
      (i) a cradle base,
      (ii) a cradle platform adapted for rotary motion with respect to said cradle base,
      (iii) a cylindrical lens adapted to receive the light beam from said optical stage,
      (iv) means for rotating said cylindrical lens about the axis of said light beam,
      (v) a galvanometer,
      (vi) a mirror, adapted to be rotated about an axis perpendicular to the axis of said light beam by said galvanometer, oriented to reflect the light beam after it emerges from said cylindrical lens,
      (vii) diverging lens, for receiving light from said mirror,
      (viii) converging lens, for receiving light from said diverging lens,
      (ix) a scanning mirror adapted to receive the light beam from said converging lens,
      (x) a first motor,
      (xi) linkage coupled to said first motor for rotating said scanning mirror,
      (xii) a lead screw assembly affixed to said cradle base for rotating said cradle platform,
      (xiii) a second motor for rotating said lead screw assembly,
      (xiv) a support frame, having an aperture therewithin, affixed to the top of said scan cradle enclosure, said aperture so oriented that light reflected by said scanning mirror passes therethrough,
      (xv) an elevating plate, having an aperture therewithin, supported above said support frame, said plate aperture and said frame aperture being in general alignment,
      (xvi) a translating jig plate, having a cut-out therewithin for supporting a face panel of a cathode ray tube, supported on said elevating plate, and adapted to be horizontally adjustable,
   (xvii) a safety cover for covering a face panel supported in said cut-out of said jig plate.

2. Laser scanning apparatus for use in manufacturing color cathode ray tubes wherein a layer of photosensitive material on the inner surface of a tube faceplate is exposed by scanning a laser beam over an array of light transmitting apertures in a mask disposed adjacent to the layer of material on the faceplate, the apparatus including:
   (a) a laser source for creating a light beam having a wavelength spectrum which exposes the photosensitive material;
   (b) an optical stage coupled to receive the light beam from said laser source and
   (c) a scan cradle enclosure, coupled to receive the light beam from said optical stage, said enclosure comprising
      (i) a cradle base,
      (ii) a cradle platform adapted for rotary motion with respect to said cradle base,
      (iii) a pair of oppositely disposed bearing posts, coaxially aligned, affixed to said cradle base,
      (iv) a pair of oppositely disposed cradle yokes, coaxially aligned with said bearing posts, adjacent thereto and medial therewith,
      (v) a first bearing sleeve supported within one of said posts and one of said yokes, (vi) a second bearing sleeve supported within the other of said posts and the other of said yokes, (vii) a cylindrical lens aligned coaxially with said first bearing sleeve and adapted to receive the light beam from said optical stage, (viii) means for rotating said cylindrical lens about the axis defined by the coaxial axis of said posts and said yokes, (ix) a galvanometer, (x) a mirror, adapted to be rotated about an axis perpendicular to said coaxial axis by said galvanometer, oriented to reflect the light beam after it emerges from said cylindrical lens, (xi) a first beam bending mirror adapted to reflect the light beam reflected by said galvanometer-rotated mirror, (xii) a movable diverging lens, (xiii) a fixed converging lens, (xiv) a second beam bending mirror, said first beam bending mirror, said diverging lens, said converging lens, and said second beam bending mirror being aligned in a common path wherein light reflected from said second beam bending mirror travels a path parallel to but in opposite direction to the light beam reflected by said galvanometer-rotated mirror, (xv) a scanning mirror adpated to receive the light beam from said second beam bending mirror, (xvi) a first motor, (xvii) linkage coupled to said first motor for rotating said scanning mirror, (xviii) a lead screw assembly affixed to said cradle base for rotating said cradle platform, (xix) a second motor for rotating said lead screw assembly, (xx) a first encoder coupled to the other of said posts, (xxi) a second encoder coupled to said scanning mirror, (xxii) a third encoder coupled to said rotating means, (xxiii) a support frame, having an aperture therewithin, affixed to the top of said scan cradle enclosure, said aperture so oriented that light reflected by said scanning mirror passes therethrough, (xxiv) an elevating plate, havng an aperture therewithin, supported above said support frame, said plate aperture and said frame aperture being in general alignment, (xxv) a translating jig plate, having a cut-out therewithin for supporting a face panel of a cathode ray tube, supported on said elevating plate, and adapted to be horizontally adjustable, (xxvi) a translation micrometer, affixed to said elevating plate, for horizontally translating said jig plate, and (xxvii) a safety cover for covering a face panel supported in said cut-out of said jig plate.

3. The apparatus as recited in claim 2 wherein said optical stage comprises (a) a shutter coupled to receive said beam from said source, (b) a beam expander telescope coupled to receive the light beam as it passes through said shutter, and (c) a shearing interferometer plate, coupled to receive the light beam upon passage through said aperture.

4. The apparatus as recited in claim 3 wherein said laser source is an argon ion laser.

5. Laser scanning apparatus for use in manufacturing color cathode ray tubes wherein a layer of photosensitive material on the inner surface of a tube faceplate is exposed by scanning a laser beam over an array of light transmitting apertures in a mask disposed adjacent to the layer of material on the faceplate, the apparatus including:

(a) a laser source for creating a light beam having a wavelength spectrum which exposes the photoelectric material;

(b) a cylindrical lens adapted to receive the beam from said laser source;

(c) a first mirror adapted to be rotated about a first axis by a galvanometer;

(d) a second mirror, adapted to reflect light transmitted thereto by said cylindrical lens via said first mirror;

(e) a motor driven image optical rotator in the path of said reflected light from said second mirror;

(f) a third mirror, adapted to reflect light from that transmitted by said rotator along a second axis perpendicular to said first axis; and (g) a rotating cradle assembly, housing said elements (b) through (f) inclusive, adapted to rotate about a third axis perpendicular to said first and second axes.

6. The apparatus as recited in claim 5 further comprising (h) a fourth mirror, adapted to reflect the reflected light from said third mirror along an axis coincident to said third axis;

(i) a lens in the light path of said fourth mirror; and (j) a scanning mirror adapted to rotate about a fourth axis parallel to said first axis, said elements (h) through (j), inclusive, being housing within said rotating cradle assembly.

7. The apparatus as recited in claim 6 further comprising (k) a telescope; and (l) a servo-driven iris, both said telescope and servo-driven iris lying in the beam path between said laser source and said rotating cradle assembly.

8. The apparatus as recited in claim 5 further comprising (h) a lens in the light path of said third mirror;

(i) means for causing rotation about said second axis; and (j) a scanning mirror, affixed to said rotation causing means, having a plane reflective surface in the path of light transmitted by said last mentioned lens, the plane of said surface lying at an angle other than perpendicular to said second axis, said elements (h) through (j), inclusive, being housed within said rotating cradle assembly.

9. The apparatus as recited in claim 8 wherein said angle is 45 degrees.

10. The apparatus as recited in claim 8 further comprising (k) a telescope; and (l) a servo-driven iris, both said telescope and servo-driven iris lying in the beam path between said laser source and said rotating cradle assembly.

* * * * *